United States Patent Office 2,728,681
Patented Dec. 27, 1955

2,728,681

COMPOSITIONS FOR SURFACING WALLS, CEILINGS AND THE LIKE

Samuel Clipson, London, England

No Drawing. Application November 25, 1952,
Serial No. 322,573

5 Claims. (Cl. 106—97)

This invention relates to compositions for surfacing walls, ceilings, slabs, bricks and the like (hereinafter referred to simply as surfacing compositions).

This application is a continuation-in-part of my application Serial No. 775,555, filed September 22, 1947, for Compositions for Surfacing Walls, Ceilings and the like, now abandoned.

Many known surfacing compositions applied as aqueous slurries have the property of setting hydraulically and are prone to crack and not to adhere tenaciously over all of the surface to be covered.

An object of my invention is to provide an improved surfacing composition which is suitable for application by spraying and by the use of which the hereinbefore referred to disadvantage is eliminated. My experiments have led me to discover that aqueous slurries of certain compositions containing an exfoliated micaceous mineral or vermiculite are suitable for application by spraying and also possess the property, when applied to a surface, of setting under such conditions that they cling tenaciously to the surface (i. e., of affording a strong interfacial bond) and do not tend to crack.

A surfacing composition in accordance with the invention essentially comprises a mixture of from 5 to 8 volumes of dry exfoliated vermiculite and from 2 to 3 volumes of a plasticiser of the group consisting of lime, chalk, whiting, china clay, lithopone, barytes, or combination of two or more of them.

My invention also involves a method of smooth-surfacing walls, ceilings and the like which comprises forming an aqueous slurry from a mixture as aforesaid, spraying the said slurry over a surface to provide a coating of the required thickness and smoothing the surface of the applied coating while simultaneously subjecting the surface to vibration for compacting the outer stratum of the coating and bring about interlocking of the individual particles of said stratum to prevent flaking and cracking.

By the term exfoliated vermiculite I mean exfoliated micaceous minerals, such as kerrite, maconite, etc., which are hydrous silicates derived generally from the alteration of some kind of mica.

Portland cement has proved experimentally to be satisfactory as a binding agent when such is required, but cement may be wholly or partly replaced by other hydraulic cements.

The preferred composition is one containing exfoliated vermiculite and lime residue or chalk within the beforementioned ranges, together with approximately 1.5 volumes of Portland cement as set forth in Example I hereinafter following. However, I have also found the proportions set forth in Examples II and III highly practical. Aqueous slurries of such compositions, while manifesting the desired properties of setting with elimination of cracking and of clinging tenaciously to the covered surface, are found to be very suitable for mechanical application by any appropriate spray gun apparatus, for example.

The following are given as examples of economically practical compositions in accordance with the invention, but are not limitative:

*Example I*

A surfacing composition prepared by thoroughly mixing together from 5 to 8 vols. (dry) of exfoliated vermiculite, approximately 2.5 vols. of a lime sludge containing 40% moisture such as that obtained as residue in the manufacture of acetylene, and approximately 1.5 vols. of cement.

*Example II*

A surfacing composition prepared by thoroughly mixing together approximately 6 vols. (dry) of exfoliated vermiculite, from 2 to 3 vols. of a lime sludge containing 40% moisture, and approximately 1.5 vols. of cement.

*Example III*

A surfacing composition prepared by thoroughly mixing together approximately 6 vols. (dry) of exfoliated vermiculite, approximately 2.5 vols. of a lime sludge containing 40% moisture, and 1 to 3.5 vols. of cement.

For use the composition of any of these examples may be worked up to a slurry with 3 volumes of water.

It will be understood that the cement acts as a binding agent and may be replaced wholly or partly by a hardener, the lime sludge being increased proportionately to maintain the ratio of matrix to aggregate.

The term cement includes Portland cement, and white cement. White cement is a cement containing an increased content of lime to produce a white instead of a grey finish.

If desired, a foaming, or air or gas entraining agent (e. g., hydrogen peroxide or aluminum powder) may be incorporated to produce a cellular coating when the surfacing composition is applied.

I have found that compositions in accordance with the invention can be applied to brickwork, stonework, wood, plasterboard, and metals. The protective coatings obtained are fire-resisting and do not crack or flake or break away.

The surface of the applied coating may be smoothed to give a close plain finish, preferably by means of a vibrated screed as disclosed in my copending patent application Serial No. 775,556, filed September 22, 1947, for Smoothing or Finishing Trowels, now Patent 2,514,626, dated July 11, 1950. The vibrations compact the surface strata of the coating and bring about good interlocking of the individual particles to prevent flaking and cracking.

My copending application Serial Number 6,233, filed February 4, 1948, for Method and Apparatus for Applying Slurries to Structural Surfaces, now Patent 2,504,805 dated April 18, 1950, shows the applicator for utilizing the composition and performing the method herein set forth.

I have developed the surfacing composition of my invention after extended research. If the vermiculite is increased beyond the upper claimed limit while working within the claimed limits of lime and cement, the water content to be added to the mix becomes supercritical. Even an increase of half a volume of vermiculite is sufficient for this to take place and there is practically no tolerance between unpumpability and floatation of the vermiculite. Further, when the vermiculite content is increased as stated, there is a marked tendency to crazing or cracking of the applied coating on setting and hardening. The sprayed surface splits very easily under tension.

On the other hand, if the vermiculite content is decreased to less than the lower limit claimed, there occurs a critical decrease in porosity of the sprayed coating which affects condensation absorption.

When working within the claimed range of vermiculite but increasing the lime content beyond the upper claimed limit, there results an increase in the density of the applied coating with increase in thermal conductivity above the practical permissible limit of 1.5. On the other hand, if the lime content is decreased, this leads to substantial irregularity of flow through the supply line.

When working with vermiculite and lime within the claimed range but increasing the cement beyond the upper limit claimed, there is a critical tendency for the applied slurry to mass, leading to an increase of density of the coating and, of course, an increase of thermal conductivity. Moreover, the applied surface crazes or cracks readily on drying and hardening.

When the cement content is decreased to less than the lower claimed limit, there is insufficient binding action of the mix, with the result that the applied coating does not adhere.

In the course of my investigations in determining the proper proportions of parts for the composition of my invention, I have conducted numerous experiments which establish the correctness of the proportions of parts set forth herein to obtain good sprayability, tenacity, K value and anti-condensation characteristics, where K designates the thermal conductivity. Thus, starting with the upper limit of the proper proportion of parts and increasing to one-half the limit of volume and then proceeding with the lower limit of the proper proportion of parts and reducing to the one-half limit of volume, I have obtained confirming experimental data which clearly establish the importance of the proportions of the components in accordance with my invention.

The data obtained are as follows:

*Sample A.*—8 vols. vermiculite, 2 vols. lime, 1 vol. cement. Some difficulty was experienced in getting the mix to travel through the line without stoppage, the mix was extremely stiff and it was necessary to agitate the line in order that the mix would travel as far as the gun. The texture was of an extremely high relief type and very sharp at its extremes. The application showed a partial separation of the vermiculite from the matrix, this may be due to the resistance of the vermiculite matrix ratio to direct spraying. The ratio was now such that the vermiculite was not coated entirely, and emission was spasmodic.

*Sample B1.*—8½ vols. vermiculite, 2 vols. lime, 1 vol. cement; normal water content, that is 3 volumes of water. This mix was stiff and not pumpable.

*Sample B2.*—8½ vols. vermiculite, 2 vols. lime, 1 vol. cement; abnormal water ¼ volume, that is ¼ of a volume of water. The consistency of the mix was such that by the addition of a small amount of water a complete separation of floatation of the vermiculite content was caused. On the other hand, a slight reduction of the moisture content would render the material too stiff to be pumpable, having reached a critical water content, which incidentally would be too critical for site measurement. When spraying the material, the vermiculite showed an increased tendency to come to the surface. From a drop sheet placed beneath the sprayed area it was noted that the material surplus was practically a coated vermiculite. The normal micro-crazing experienced was considerably exaggerated.

*Sample C1.*—9 vols. vermiculite, 2 vols. lime, 1 vol. cement; normal water, that is 3 volumes of water. The consistency was considerably stiffer than that explained in Sample B1.

*Sample C2.*—9 vols. vermiculite, 2 vols. lime, 1 vol. cement; abnormal water ½ volume, that is ½ of a volume of water. Results were considerably worse than those described in Sample B2.

*Sample D.*—4½ vols. vermiculite, 3 vols. lime, 2 vols. cement. This is half volume below the lower limit of the specification. The mass was anticipated to be such that the increase in density and consequent increase in K figure would render the material unsuitable as a thermally insulating material, assuming the maximum K figure to be 1.5 for a thermally insulating material.

*Sample E.*—Density 66 lbs./cu. ft.; thermal conductivity K—1.8. The material of this sample was outside the thermal insulating range.

Generally the mix showed an easy tendency to travel through the line and, in fact, sprayed well, but an emission from the gun seemed slack and under normal air pressure came through the gun in blobs and easily flattened to the wall.

The foregoing experimental determinations clearly establish the importance of the range of components as set forth herein.

While I have described my invention in certain of its preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. A composition for coating surfaces by spraying, comprising a mixture of from 5 to 8 volumes of dry exfoliated vermiculite; 2.5 volumes of a lime sludge containing 40% moisture; approximately 1.5 volumes of Portland cement, and 3 volumes of water.

2. A composition for coating surfaces by spraying, comprising a mixture of approximately 6 volumes of dry exfoliated vermiculite; from 2 to 3 volumes of a lime sludge containing 40% moisture; approximately 1.5 volumes of Portland cement, and 3 volumes of water.

3. A composition for coating surfaces by spraying, comprising a mixture of approximately 6 volumes of dry exfoliated vermiculite; approximately 2.5 volumes of a lime sludge containing 40% moisture; 1 to 3.5 volumes of Portland cement, and 3 volumes of water.

4. A composition sprayable upon a surface for forming an interfacial crack resisting bond comprising a mixture of from 5 to 8 volumes of dry exfoliated vermiculite; 2 to 3 volumes of a lime sludge containing 40% moisture; 1 to 3.5 volumes of Portland cement; and 3 volumes of water intermixed to form a sprayable consistency.

5. A composition sprayable upon a surface for forming an interfacial crack resisting bond as set forth in claim 4 in which the thermal conductivity of the sprayable consistency is of the order of 1.5.

References Cited in the file of this patent

UNITED STATES PATENTS

| | | |
|---|---|---|
| 1,257,488 | Kemper | Feb. 26, 1918 |
| 1,456,924 | Haynes et al. | May 29, 1923 |
| 1,688,542 | Harrison | Oct. 23, 1928 |
| 2,043,249 | Jones | June 9, 1936 |
| 2,083,961 | New | June 15, 1937 |
| 2,296,453 | Saffert | Sept. 22, 1942 |
| 2,400,341 | Day | May 14, 1946 |

OTHER REFERENCES

Sprayo-Flako Insulation, pages 6 and 7, published by Sprayo Flako on July 15, 1940.